(12) United States Patent
Song

(10) Patent No.: US 8,712,754 B2
(45) Date of Patent: Apr. 29, 2014

(54) REQUIREMENTS MODEL COMPARATIVE ANALYSIS METHOD FOR EFFORT ESTIMATION IN CUSTOMIZING A NETWORK MONITORING AND CONTROL SYSTEM

(75) Inventor: Xiping Song, Cranbury, NJ (US)

(73) Assignee: Siemens Aktiengesellschaft, München (DE)

( * ) Notice: Subject to any disclaimer, the term of this patent is extended or adjusted under 35 U.S.C. 154(b) by 428 days.

(21) Appl. No.: 13/151,462

(22) Filed: Jun. 2, 2011

(65) Prior Publication Data

US 2011/0313750 A1  Dec. 22, 2011

Related U.S. Application Data

(60) Provisional application No. 61/356,144, filed on Jun. 18, 2010.

(51) Int. Cl.
*G06F 13/00* (2006.01)

(52) U.S. Cl.
USPC .......................................................... 703/21

(58) Field of Classification Search
USPC .......................................................... 703/21
See application file for complete search history.

(56) References Cited

PUBLICATIONS

Song et al.; (inventor): S-RaP: A Concurrent Prototyping Process for Refining Workflow-Oriented Requirements; Proceedings of the 2005 13th IEEE International Conference on Requirements Engineering (RE'05); pp. pp. 1-5.*

Lee et al.; UML Model for the IEEE 1451.1 Standard; IMTC 2003—Inst. and Measurement; Tech Conf.; 2003; pp. 1587-1592.*
Forsgren: Requirements Specification in SCADA/EMS/DMS Procurement Projects; Power System Control and Management, Apr. 16-18, 1996, Conference Publication No. 421, 0 IEE, 1996; pp. 226-230.*
Kuusela J., Savolainen, J. Requirement Engineering for Product Families, ICSE2000. Limerick, Ireland, p. 61-69.
Savolainen J Kuusela, J.; Consistency management of product line requirements. Requirements Engineering, 2001. Proceedings. Fifth IEEE International Symposium on Aug. 27-31, 2001 pp. 40-47.
John Mylopoulos, Lawrence Chung, Brian Nixon, "Representing and Using Nonfunctional Requirements: A Process-Oriented Approach", IEEE Transactions on Software Engineering, vol. 18, No. 6, Jun. 1992 p. 483-497.
Nissen, H.W., Schmitz, D., Jarke M., Rose, T., Drews, P., Hesseler, F.J., Evolution in Domain Model-based Requirements Engineering for Control Systems Development, 2009 17th IEEE International Requirements Engineering Conference, pp. 323-328.

* cited by examiner

*Primary Examiner* — Hugh Jones
(74) *Attorney, Agent, or Firm* — Michele L. Conover

(57) ABSTRACT

A method, including: receiving, at a processing device, an input, wherein the input includes a first model of data flows between a proposed Network Monitoring and Control (NMC) unit and devices connected to the proposed NMC unit, wherein the first model is based on a Request for Proposal (RFP) and the data flows are defined by data types and primitives conforming to a modeling formalism; and comparing, by using the processing device, the first model with a second model, wherein the second model is a model of data flows between a previously developed NMC unit and devices connected to the previously developed NMC unit, wherein the second model is based on a prior RFP and the data flows are defined by data types and primitives conforming to the modeling formalism, wherein the comparison identifies differences between the data flows of the first and second models.

19 Claims, 6 Drawing Sheets

REQUIREMENTS MODEL COMPARATIVE ANALYSIS METHOD FOR EFFORT ESTIMATION IN CUSTOMIZING A NETWORK MONITORING AND CONTROL SYSTEM

CROSS-REFERENCE TO RELATED APPLICATION

This application claims priority under 35 U.S.C. §119 to U.S. Provisional Application No. 61/356,144, filed Jun. 18, 2010, the disclosure of which is incorporated by reference herein in its entirety.

BACKGROUND OF THE INVENTION

1. Technical Field

The present invention relates to, offer/bid development in a solution project, and more particularly, to a method of estimating the cost in customizing a Network Monitoring and Control (NMC) system.

2. Discussion of the Related Art

Network Monitoring and Control (NMC) systems are provided for different industrial domains such as transportation, building service and industrial automation. A NMC system monitors field devices and equipment, and activates predefined processing or control upon a status change of the equipment or field devices. A NMC system deployed in a solution project may be customized in accordance with the number of devices being monitored as well as different types of the devices. A solution project may be referred to as a project that is composed of the analysis of the business process and implementation of an integrated system to improve the business process with more advanced concepts, technologies and products. The logic for deciding when to activate a processing or control can vary depending on application-specific requirements.

Non-functional requirements (NFRs) for a NMC system are different for different NMC needed solution projects, and thus, NFRs are defined to address project specific needs. For example, the NFR of a safety-critical solution project may require a high availability. Further, a NFR may require Heating, Ventilating and Air Conditioning (HVAC) equipment in an equipment room that may endure an extreme weather condition (e.g., very low temperature) to be monitored to ensure the temperature of the room is maintained within the operation range of the HVAC equipment. However, for an equipment location that is unlikely to endure an extreme weather condition, such monitoring would be unnecessary and thus the NFR would not be defined.

FIG. 1 shows how the requirement definition (or NFR) is related to system customization and integration in a life-cycle of a solution project. As shown in FIG. 1, the solution project begins with the requirement definition of a NMC to be developed (110). The NMC is customized and integrated according to the requirement definition (120). The customization may entail developing new software modules to process data from additional sensors or send a control signal to additional actuators. The integration would involve incorporating these new software modules into the NMC system. The NMC is deployed (130). The deployment would install the hardware such as sensors, equipment and actuators in the application environment, and install the software system that controls the equipment. Post-deployment (140) may entail the maintenance and other supports for operating the deployed NMC.

Before bidding on a solution project where a NMC plays a key role, it is important for bidders to have a reliable estimate of the customization work. In other words, within the bidding period, which is usually short, a bidder needs to precisely estimate how much of the NMC system needs to be customized. The customization work could be estimated as a number of new software modules and user interfaces to be developed, or as any new mechanism (e.g., using a security token as an electronic key for authentication) that needs to be developed to address the NFR requirements (e.g., high level of security). From a hardware aspect, to make the NMC system integrate with its external environment, the estimate also needs to include the cost for the interface devices that enable the communication between the NMC system and its external environment (e.g., HVAC to be monitored). Accordingly, there is a need to enhance offer/bid development in a solution project.

SUMMARY OF THE INVENTION

An exemplary embodiment of the present invention provides a method for estimating the cost in customizing a Network Monitoring and Control (NMC) system for a specific market region (e.g., China, Europe, North America), market segment (e.g., low-end, high-end) or solution project. The method can be used for bidding a solution project as well as performing a requirements tradeoff analysis during the realization of a solution project. For example, in a solution project, the method enables the offer/bid development to be finished quickly to meet a request for proposal (RFP) deadline. Further, the method provides a reliable cost estimate for the bidder to make a profit from the development of the solution project.

In an exemplary embodiment of the present invention, there is provided a method including: receiving, at a processing device, an input, wherein the input includes a first model of data flows between a proposed NMC unit and devices connected to the proposed NMC unit, wherein the first model is based on a RFP and the data flows are defined by data types and primitives conforming to a modeling formalism; and comparing, by using the processing device, the first model with a second model, wherein the second model is a model of data flows between a previously developed NMC unit and devices connected to the previously developed NMC unit, wherein the second model is based on a prior RFP and the data flows are defined by data types and primitives conforming to the modeling formalism, wherein the comparison identifies differences between the data flows of the first and second models.

The method further includes determining, by using the processing device, an estimated cost to make the proposed NMC unit based on the comparison. The devices include sensors, equipment and actuators.

The data types of the modeling formalism include status and control, the data flow between a sensor and the NMC unit includes a status of that sensor, the data flow between an equipment and the NMC unit includes a status of that equipment and a control to be performed by that equipment and the data flow between the actuator and the NMC unit include a control to be performed by that actuator.

The comparison includes: comparing the devices of the first model with the devices of the second model; identifying overlapping devices between the first and second models, wherein in response to identifying overlapping sensors, the statuses of the overlapping sensors are compared to each other to find sensor statuses of the first model that are different from sensor statuses of the second model, wherein in response to identifying overlapping actuators, the controls of the overlapping actuators are compared to each other to find actuator controls of the first model that are different from actuator controls of the second model, wherein in response to identifying overlapping equipment, the statuses of the overlapping equipment are compared to each other to find equipment statuses of the first model that are different from equipment statuses of the second model and the controls of the overlapping equipment are compared to each other to find equipment controls of the first model that are different from equipment controls of the second model; and first compiling the different sensor statues, the different actuator controls, the different equipment statuses and the different equipment controls.

The comparison further includes: identifying devices between the first and second models that do not overlap; and second compiling statuses from sensors of the first model that do not overlap with sensors of the second model, statuses and controls from equipment of the first model that do not overlap with equipment of the second model and controls from actuators of the first model that do not overlap with actuators of the second model.

Determining the estimated cost to make the proposed NMC unit includes inputting the first compiled different sensor statues, different actuator controls, different equipment statuses and different equipment controls and second compiled statuses from sensors of the first model that do not overlap with sensors of the second model, statuses and controls from equipment of the first model that do not overlap with equipment of the second model and controls from actuators of the first model that do not overlap with actuators of the second model into a data processing tool, wherein the data processing tool generates the estimated cost to make the proposed NMC unit.

The first and second models are manually generated. The proposed NMC unit and the previously developed NMC unit share a plurality of similarities.

In an exemplary embodiment of the present invention, there is provided a computer program product including: a non-transitory computer readable storage medium having computer readable program code embodied therewith, the computer readable program code comprising: computer readable program code configured to perform the steps of: receiving an input, wherein the input includes a first model of data flows between a proposed NMC unit and devices connected to the proposed NMC unit, wherein the first model is based on a RFP and the data flows are defined by data types and primitives conforming to a modeling formalism; and comparing the first model with a second model, wherein the second model is a model of data flows between a previously developed NMC unit and devices connected to the previously developed NMC unit, wherein the second model is based on a prior RFP and the data flows are defined by data types and primitives conforming to the modeling formalism, wherein the comparison identifies differences between the data flows of the first and second models.

The computer readable program code is further configured to perform the step of estimating a cost to make the proposed NMC unit based on the comparison. The devices include sensors, equipment and actuators.

The data types of the modeling formalism include status and control, the data flow between a sensor and the NMC unit includes a status of that sensor, the data flow between an equipment and the NMC unit includes a status of that equipment and a control to be performed by that equipment and the data flow between the actuator and the NMC unit include a control to be performed by that actuator.

The comparison includes: comparing the devices of the first model with the devices of the second model; identifying overlapping devices between the first and second models, wherein in response to identifying overlapping sensors, the statuses of the overlapping sensors are compared to each other to find sensor statuses of the first model that are different from sensor statuses of the second model, wherein in response to identifying overlapping actuators, the controls of the overlapping actuators are compared to each other to find actuator controls of the first model that are different from actuator controls of the second model, wherein in response to identifying overlapping equipment, the statuses of the overlapping equipment are compared to each other to find equipment statuses of the first model that are different from equipment statuses of the second model and the controls of the overlapping equipment are compared to each other to find equipment controls of the first model that are different from equipment controls of the second model; and first compiling the different sensor statues, the different actuator controls, the different equipment statuses and the different equipment controls.

The comparison further includes: identifying devices between the first and second models that do not overlap; and second compiling statuses from sensors of the first model that do not overlap with sensors of the second model, statuses and controls from equipment of the first model that do not overlap with equipment of the second model and controls from actuators of the first model that do not overlap with actuators of the second model.

Determining the estimated cost to make the proposed NMC unit includes inputting the first compiled different sensor statues, different actuator controls, different equipment statuses and different equipment controls and second compiled statuses from sensors of the first model that do not overlap with sensors of the second model, statuses and controls from equipment of the first model that do not overlap with equipment of the second model and controls from actuators of the first model that do not overlap with actuators of the second model into a data processing tool, wherein the data processing tool generates the estimated cost to make the proposed NMC unit.

The first and second models are manually generated. The proposed NMC unit and the previously developed NMC unit share a plurality of similarities.

In an exemplary embodiment of the present invention, there is provided a method including: developing a first model of data flows between a first software module and devices monitored and under control of the first software module; comparing the first model with a second model of data flows between a second software module and devices monitored and under control of the second software module, wherein the first and second models share the same modeling formalism; and identifying data flows in the first model that are not in the second model, wherein the method is performed using a processor.

The method may further include determining, based on the identified data flows, a cost estimate to produce the first software module and the devices monitored and under control of the first software module.

DETAILED DESCRIPTION OF EXEMPLARY EMBODIMENTS

The present invention provides a method for estimating the cost in customizing or localizing (e.g., customizing a product to fit the needs of a regional market) a Network Monitoring and Control (NMC) system for a specific solution project. The cost includes the software development cost and hardware/interface cost. The method utilizes a novel Interface Data Flow (IDF) model of NMC requirements. NMC requirements may include Non-Functional Requirements (NFR) of the NMC system. The key idea is to compare the IDF model of the proposed NMC requirements with the IDF model(s) of the NMC requirements from prior projects. The differences will be used for analyzing the customization cost.

Figure 1:
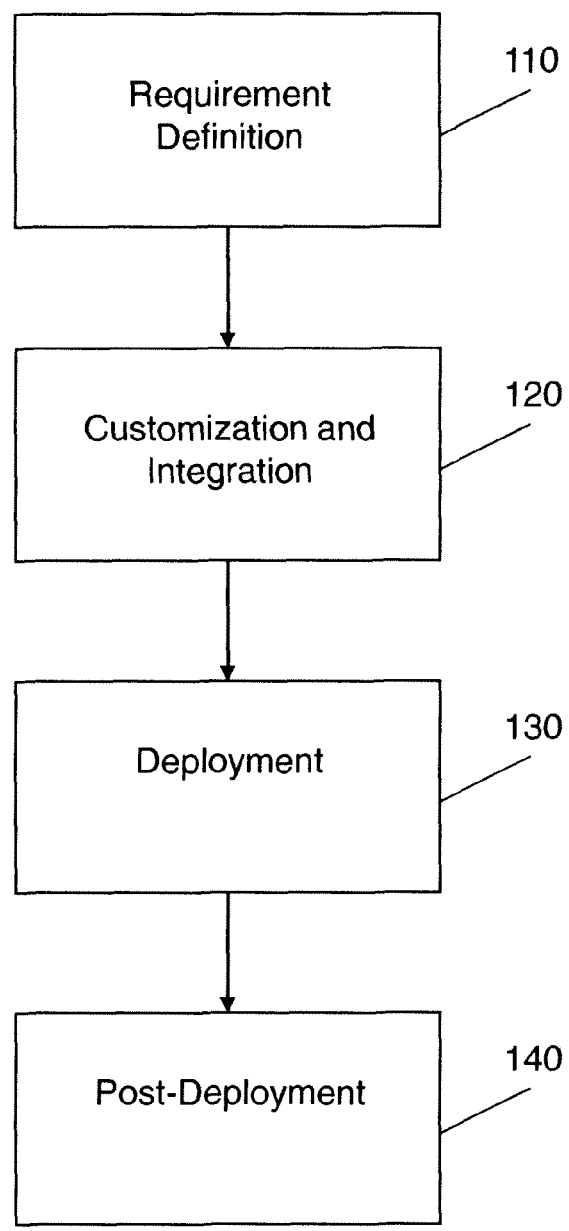
FIG. 1 illustrates an example life-cycle of a solution project.
Figure 2:
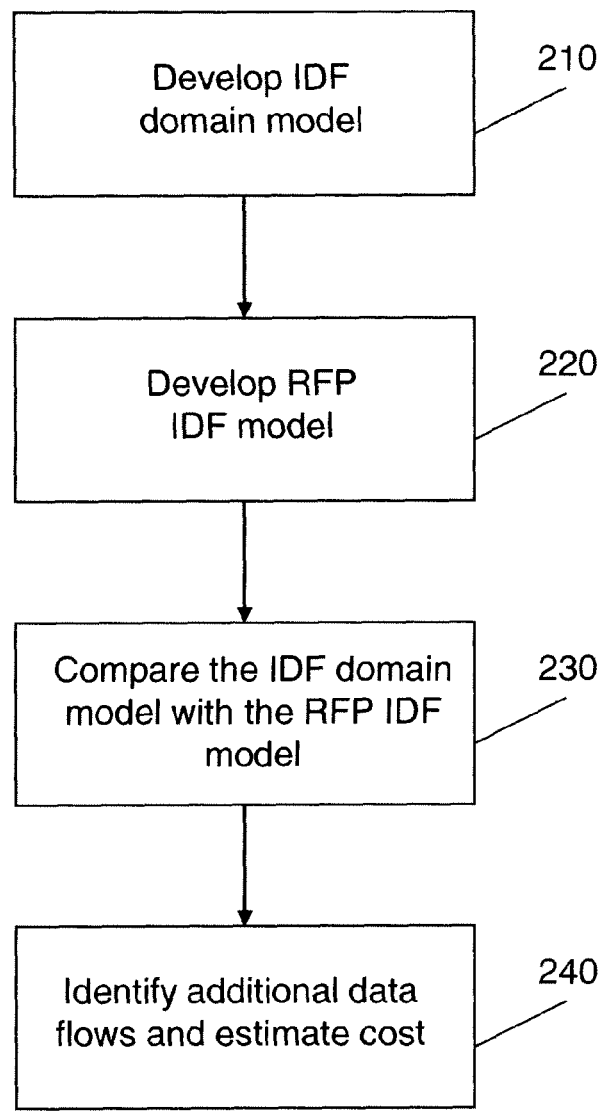
FIG. 2 illustrates a cost estimation method according to an exemplary embodiment of the present invention.

FIG. 2 illustrates the key steps of an exemplary embodiment of the method: develop the IDF domain model (210), develop the IDF requirement model of the current solution project (also referred to as the request for proposal (RFP) IDF model)(220), compare the IDF domain model with the IDF requirement model of the current solution project (230), and identify additional data flows and estimate cost (240). These steps are introduced at this stage of the application as a frame of reference, but will be described in greater detail as the application description progresses.

Figure 3:
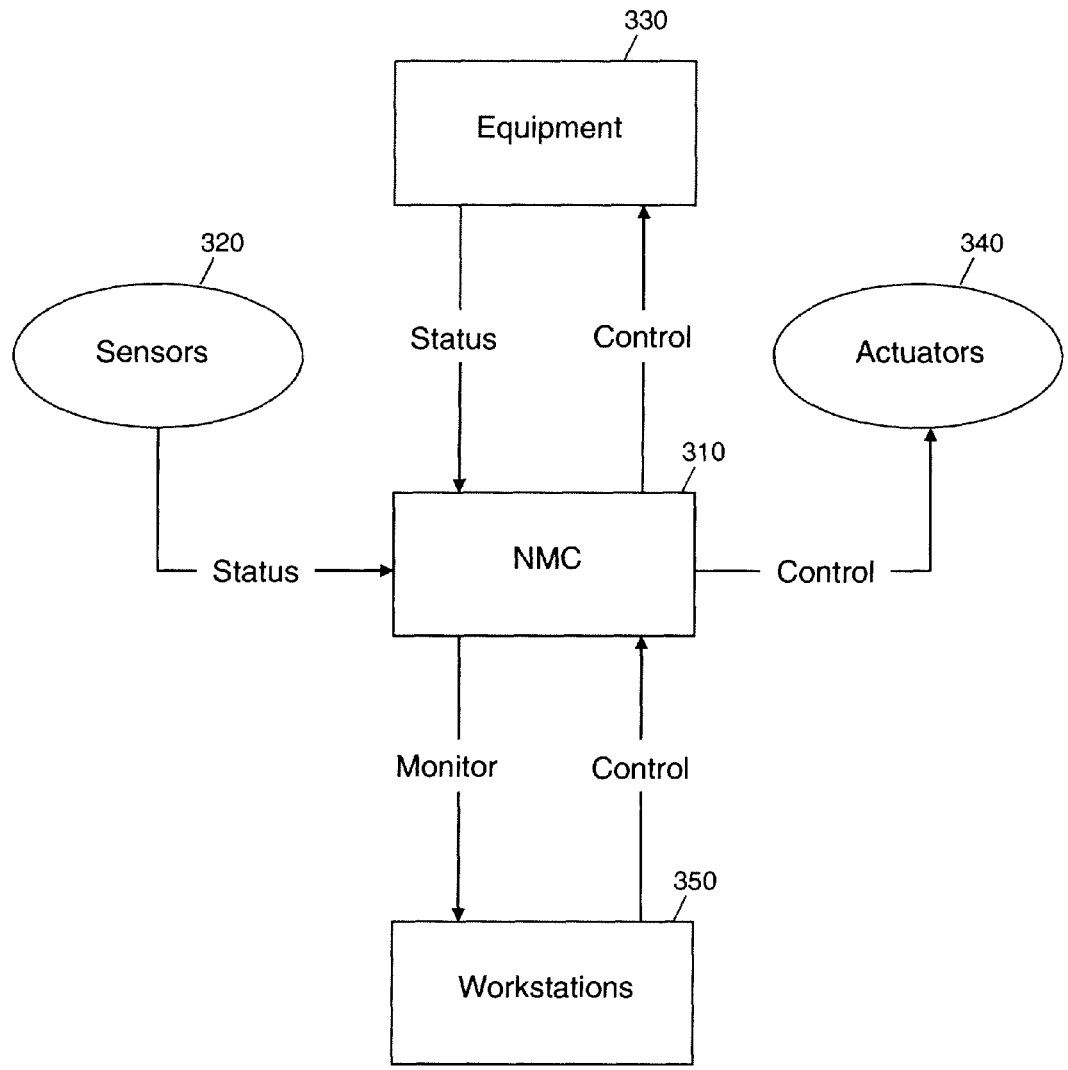
FIG. 3 illustrates an example of a Network Monitoring and Control (NMC) system.

FIG. 3 illustrates an example of a Network Monitoring and Control (NMC) system. The NMC system includes an NMC unit 310 communicably coupled to sensors 320, equipment 330, actuators 340 and workstations 350. The connection between the NMC unit 310 and the other devices shown in FIG. 3 is wired or wireless. The NMC unit 310 may be a HVAC monitoring and control system. The sensors 320 may be temperature sensors. The equipment 330 may be HVAC equipment. The actuators 340 may be dampers, or controls to other equipment such as a backup HVAC, or application equipment operating on site. The workstations 350 may be computers and their display monitors.

The modeling formalism according to an exemplary embodiment of the present invention is used to make the IDF domain model and the RFP IDF model. The modeling formalism creates the IDF domain model by formalizing and summarizing all the data flows of a NMC from a prior project or projects with its/their external environment (e.g., sensors, equipment, actuators, etc.). In particular, assuming FIG. 3 represents a prior solution project, the IDF domain model captures the data flows (e.g., statuses) from the equipment 330 and sensors 320 to the NMC unit 310 and the controls from the NMC unit 310 to the equipment 330 and actuators 340. This model will be used as the domain model for customization need. Further, since such a domain model is built upon the requirements of prior completed solution projects, a software system may have already been built to support this domain model. The RFP IDF model is made in much the same way except that the data flows between a proposed NMC unit and its external environment are based on a RFP.

Table 1 shows the definitions of data types and primitives used in the modeling formalism according to an exemplary embodiment of the present invention. Each data flow item is represented as a combination of a data type and a predetermined primitive. For example, with reference to FIG. 3, a data flow item can be "Control:Close," which represents control data from the NMC unit 310 to the equipment 330 or actuator 340. Another data flow item can be "Staus:On/Off," which represents status data sent from the equipment 330 or the sensor 320 to the NMC 310 unit. VAR represents an application specific key word. For example, for fire suppression, VAR could be a suppression agent. So, the Suppression Agent Low could be a status.

TABLE 1

| Data Type | Predefined Primitive | Definitions |
| --- | --- | --- |
| Control | | A data signal from NMC to equipment or actuator |
| | Close | Close a contact (e.g., door) |
| | Open | Open a contact |
| | Configure | Set configuration data (e.g., time schedule) |
| | Stop | Interrupt the operation |
| | Shutdown | Shut down completely |
| | Start | Start the equipment or actuator |
| | Test | Send a test command |
| | Command | Send a specific command as denoted by VAR |
| | VAR | VAR to equipment |
| Status | | Data sent from equipment or sensor to NMC |
| | On/Off | Equipment or sensor is on or off |
| | Test Result | Equipment passed test or failed test |
| | Aborted | Is equipment abnormally stopped? |
| | VAR Low | Some material being used is at too low level |
| | VAR Released | Certain control of the equipment has been issued |

Figure 4:
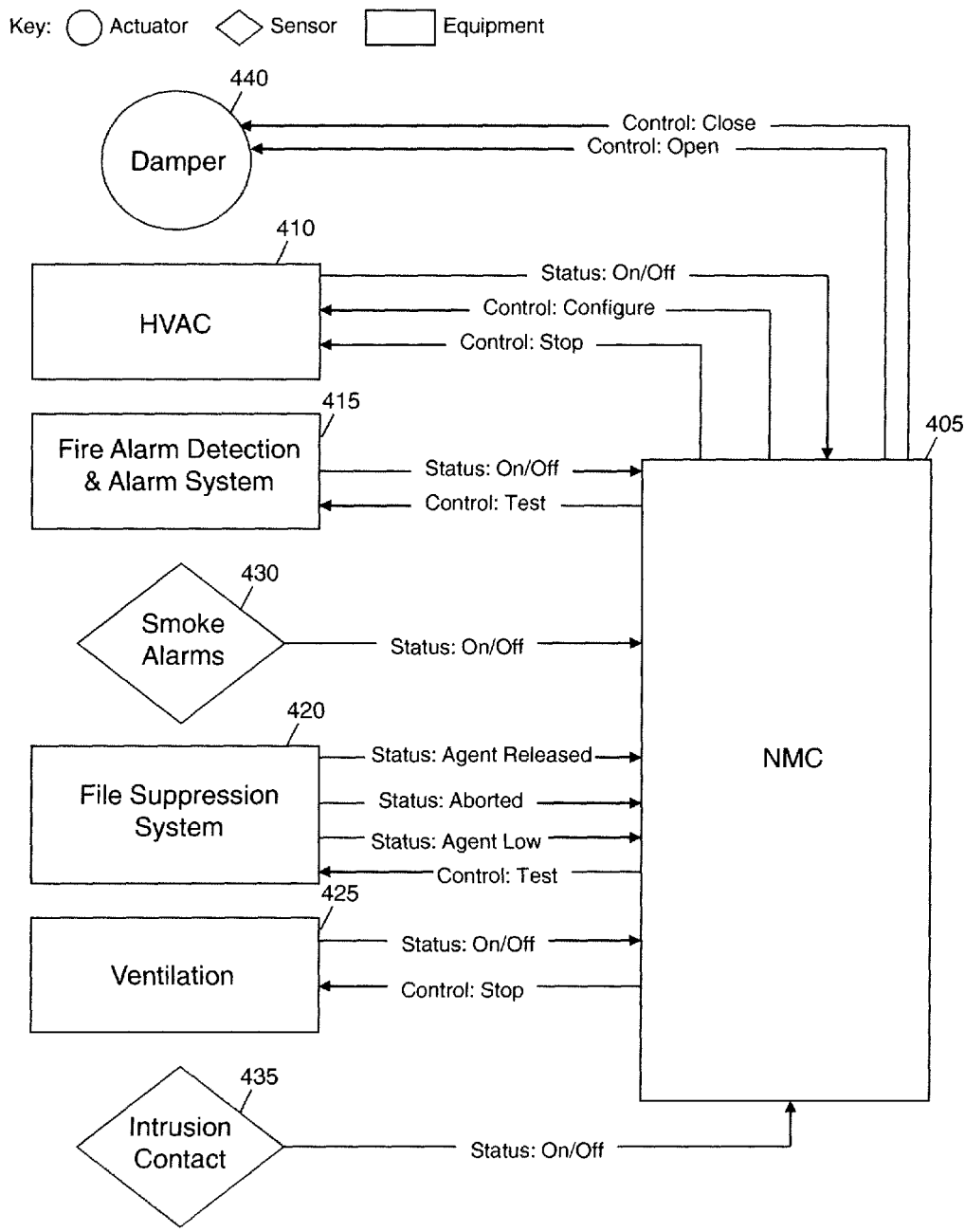
FIG. 4 illustrates an Interface Data Flow (IDF) model of a previously developed NMC according to an exemplary embodiment of the present invention.

FIG. 4 shows an example of an IDF model from a prior project. This model may be used as the aforementioned domain model. As shown in FIG. 4, the IDF model captures the data flows between a NMC 405, equipment 410-425, sensors 430-435 and an actuator 440 installed in a building. Assuming the proposed solution is for a new building, the RFP IDF model can be built similarly and compared with the IDF domain model to check what additional data flows need to be supported. More specifically, the comparative analysis will result in a set of additional data flows that represent the sensor or equipment statuses and the additional controls the new NMC needs to send to the equipment or actuators.

FIG. 4 is a simple example. However, for a large scale solution project, the NMC may not only monitor and control equipment in one application (e.g., building service related equipment), but also equipment in other application domains such as communication, power supply systems and application related equipment. Thus, the domain model will be more complex and manual analysis of the models may be difficult and time consuming. In this case, the models may be converted into a database or spreadsheet. For spreadsheets, there are existing techniques to compare spreadsheet columns which might be applied. For using databases, a set of queries and a driver that executes the queries can be developed to query the data flows to each actuator, device or equipment. Then, comparisons of the query results can be made.

Figure 5:
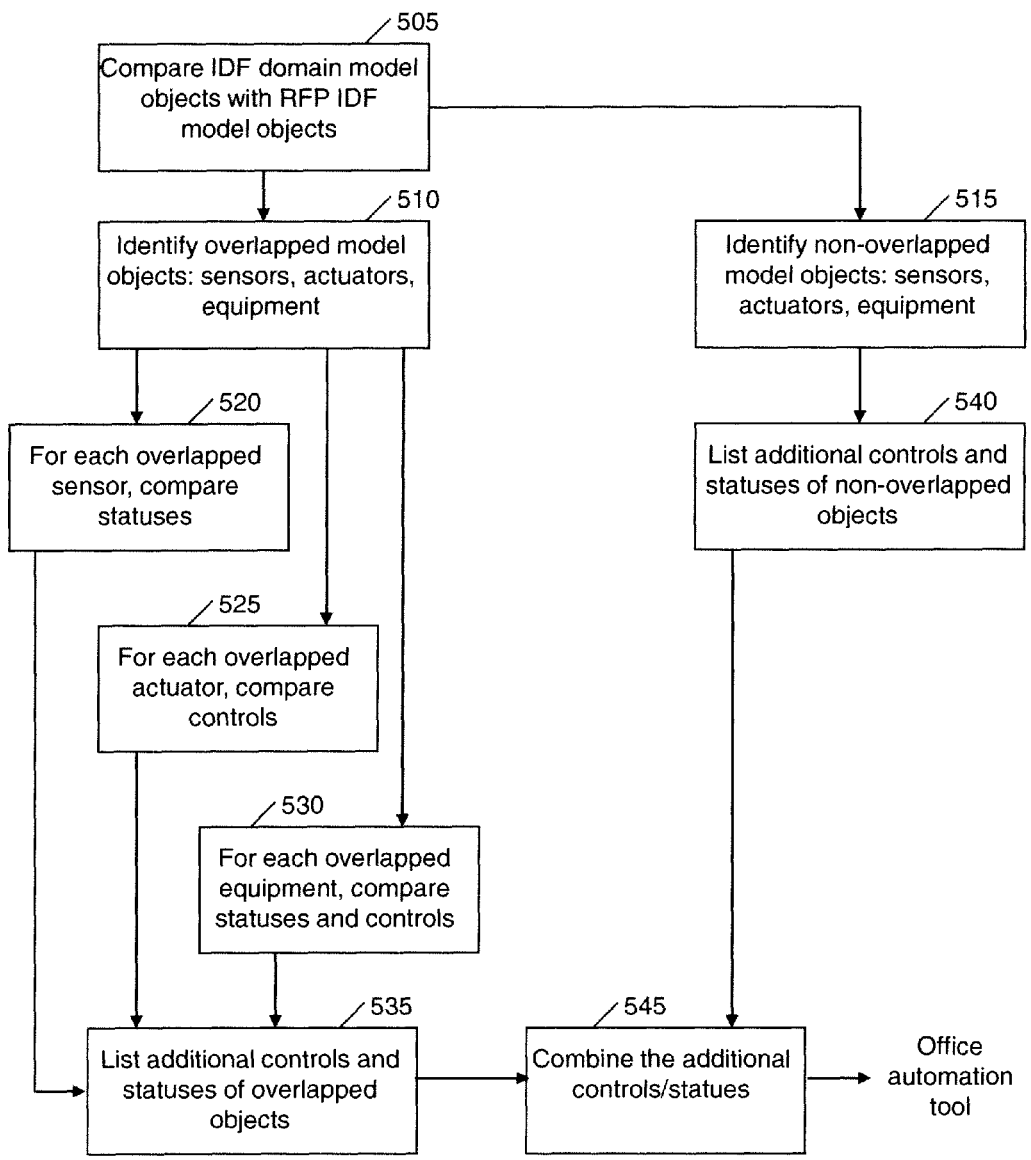
FIG. 5 illustrates a comparison step of a cost estimation method according to an exemplary embodiment of the present invention.

Independent of using a database or spreadsheet, the comparative analysis process may be performed according to the exemplary embodiment of the invention shown in FIG. 5. As shown in FIG. 5, the IDF domain model objects are compared with the RFP IDF model objects (505). Overlapped model objects are then identified (510). In other words, sensors, actuators and equipment that are shared by both models are found.

For each overlapped sensor pair, the statuses are compared to each other to find sensor statuses of the RFP IDF model that are different from sensor statuses of the IDF domain model (520). For each overlapped actuator pair, the controls are compared to each other to find actuator controls of the RFP IDF model that are different from actuator controls of the IDF domain model (525). For each overlapped equipment pair, the statuses are compared to each other to find equipment statuses of the RFP IDF model that are different from equipment statuses of the IDF domain model and the controls are compared to each other to find equipment controls of the RFP IDF model that are different from equipment controls of the IDF domain model (530). The additional controls and statuses are then gathered into a list (535).

Non-overlapping model objects are also identified (515). In other words, those sensors, equipment and/or actuators of the RFP IDF model that are not found in the IDF domain model are identified. A list of additional controls and statuses of the non-overlapped objects is generated (540). This list is combined with the list of additional controls and statuses generated in 535 (545).

As shown in FIG. 5, the end result is a set of additional controls and statuses. For example, the additional material could be "Ventilation:Control:Start," assuming an application needs to start a ventilation equipment but the current IDF domain does not support that. Clearly, this may entail some new development. Although the exemplary embodiment of the present invention is described for an equipment type, the present invention can model instances (or subtypes) of the same equipment type. For example, ventilation can be extended to Ventilation XXX equipment. Thus, there can be multiple ventilation equipment in the RFP IDF model. However, this may increase the complexity of the RFP IDF model and the time needed to develop the model. Users of the present invention can extend the model depending on their resources and time limit.

The set of additional controls and statuses along with associated cost estimates can be readily fed into a data processing tool to calculate the development and hardware cost. The associated cost estimates could be gathered from the prior projects or from market information (e.g., for hardware). The data processing tool could be spreadsheet based. The users can use the spreadsheet features to sort and group the additional controls and statuses, for example, based upon the related objects. Then the cost number can be allocated to those additional controls and statuses. Using the spreadsheet calculation capability, the user would be able to readily estimate the cost for the NMC customization.

Figure 6:
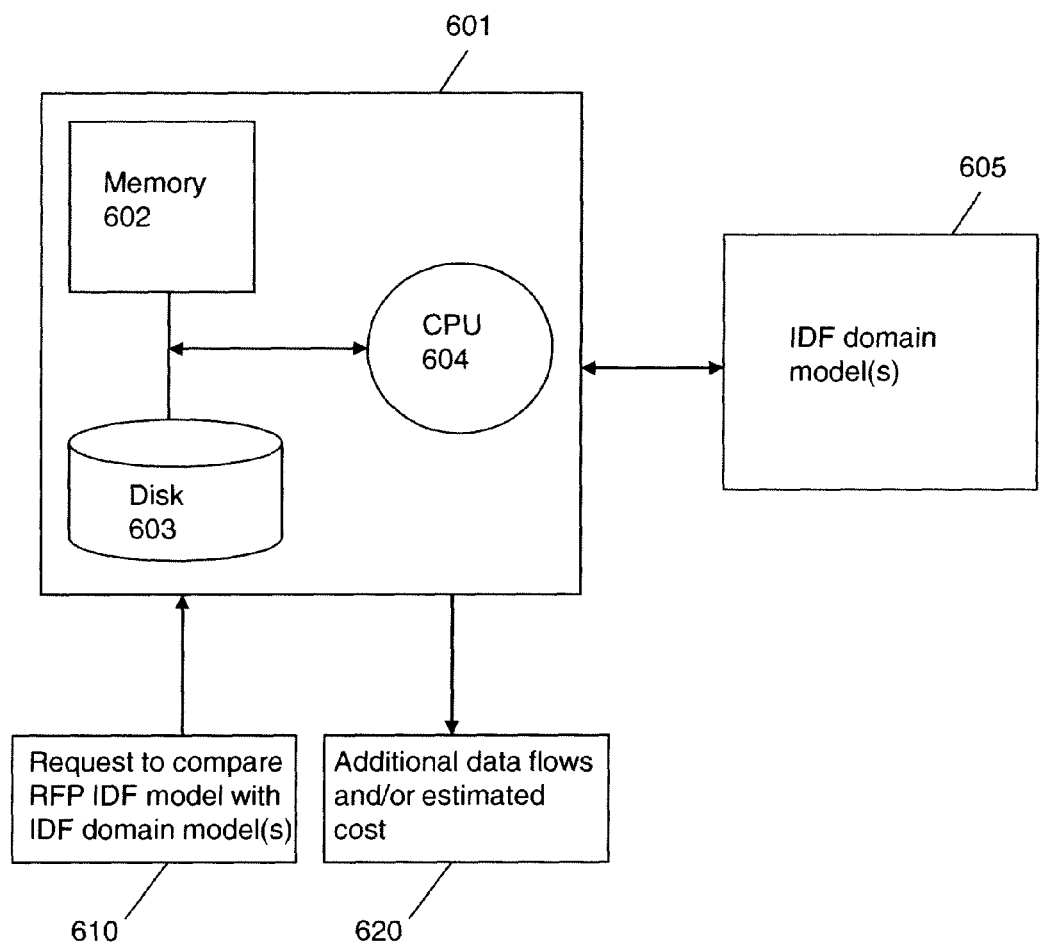
FIG. 6 illustrates a computer system in which an exemplary embodiment of the present invention may be implemented.

An exemplary embodiment of the present invention will now be described with reference to apparatus 601 in FIG. 6. The apparatus 601, which may be a computer, includes a memory 602, a disk 603, and a processor such as a central processing unit (CPU) 604. The apparatus 601 may be connected to a IDF domain model(s) storage source 605 via a wired or wireless network. The IDF domain model(s) may be stored in the memory 602.

It is to be understood that the term "processor" as used herein is intended to include any processing device, such as, for example, one that includes a CPU and/or other forms of processing circuitry. Further, the term "processor" may refer to more than one individual processor. The term "memory" is intended include memory associated with a processor or CPU, such as, for example, random access memory (RAM), read only memory (ROM), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer).

In a solution project, for example, an offer needs to be finished quickly to meet a RFP deadline. At the same time, the offer needs to be based on a reliable cost estimate for the bidders to make profit from the solution development. In this case, the bidder can input, to an input interface of the apparatus 601, a request 610 to compare a RFP IDF model with prior associated IDF domains models(s). A response 620 to the request, which may include additional data flows based on the comparison, is generated according to the processes described above and output to an output interface of the apparatus 601. Thus, enabling the bidder to quickly estimate the additional data flows to be supported. Then, the bidder can feed the data flow estimation into office automation tools to estimate the cost. The estimated cost may be computed by the apparatus 601 and outputted as part of the response 620.

The present invention describes an approach for solution project offer development. It focuses primarily on the NMC system where data flow is key in estimating the development effort. The result can be readily integrated with existing office automation tools. The present invention can reduce the time for developing an offer for a solution project and increase the reliability of the estimate for the cost of customizing a NMC system. Further, the modeling effort of the present invention is less than that of a goal-driven modeling approach.

The present invention may be extended for use with a NMC system that has more demanding requirements on the application logic and data interaction performance than a NMC system in which the data flow interface represents the key characteristics of the application. Thus, rather than capturing the differences in the IDF models as is done in the latter NMC system, capturing the application logic differences may work more effectively for estimation. As mentioned prior, a key aspect of the present invention is to compare a proposed requirement model, which is based upon a RFP, with a requirement model from a previously finished solution project to understand how much additional work needs to be done to realize the proposed model. This idea can be applied to a variety of application domains as long as the captured requirements models represent the key characteristics of the corresponding systems.

In an exemplary embodiment, the present invention may be implemented in software as an application program tangibly embodied on a program storage device (e.g., magnetic floppy disk, RAM, compact disk read (CD) ROM, digital video disk (DVD), ROM, and flash memory). The application program may be uploaded to, and executed by, a machine comprising any suitable architecture.

It is to be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

While the present invention has been described in detail with reference to exemplary embodiments thereof, those skilled in the art will appreciate that various modifications and substitutions can be made thereto without departing from the spirit and scope of the present invention as set forth in the appended claims.

What is claimed is:

1. A method, comprising:

receiving, at a processing device, an input, wherein the input includes a first model of data flows between a proposed Network Monitoring and Control (NMC) unit and devices connected to the proposed NMC unit, wherein the first model is based on a Request for Proposal (RFP) and the data flows are defined by data types and primitives conforming to a modeling formalism; and comparing, by using the processing device, the first model with a second model, wherein the second model is a model of data flows between a previously developed NMC unit and devices connected to the previously developed NMC unit, wherein the second model is based on a prior RFP and the data flows are defined by data types and primitives conforming to the modeling formalism, wherein the comparison identifies differences between the data flows of the first and second models, wherein the devices include sensors, the data types of the modeling formalism include status and control, and the data flow between a sensor and the NMC unit includes a status of that sensor, wherein the comparison comprises comparing the devices of the first model with the devices of the second model and identifying overlapping devices between the first and second models, wherein in response to identifying overlapping sensors, the statuses of the overlapping sensors are compared to each other to find sensor statuses of the first model that are different from sensor statuses of the second model.

2. The method of claim 1, further comprising determining, by using the processing device, an estimated cost to make the proposed NMC unit based on the comparison.

3. The method of claim 2, wherein the devices include equipment and actuators.

4. The method of claim 3, wherein the data flow between an equipment and the NMC unit includes a status of that equipment and a control to be performed by that equipment and the data flow between the actuator and the NMC unit include a control to be performed by that actuator.

5. The method of claim 4, wherein in response to identifying overlapping actuators, the controls of the overlapping actuators are compared to each other to find actuator controls of the first model that are different from actuator controls of the second model, wherein in response to identifying overlapping equipment, the statuses of the overlapping equipment are compared to each other to find equipment statuses of the first model that are different from equipment statuses of the second model and the controls of the overlapping equipment are compared to each other to find equipment controls of the first model that are different from equipment controls of the second model; and first compiling the different sensor statues, the different actuator controls, the different equipment statuses and the different equipment controls.

6. The method of claim 5, wherein the comparison further comprises:

identifying devices between the first and second models that do not overlap; and second compiling statuses from sensors of the first model that do not overlap with sensors of the second model, statuses and controls from equipment of the first model that do not overlap with equipment of the second model and controls from actuators of the first model that do not overlap with actuators of the second model.

7. The method of claim 6, wherein determining the estimated cost to make the proposed NMC unit comprises inputting the first compiled different sensor statues, different actuator controls, different equipment statuses and different equipment controls and second compiled statuses from sensors of the first model that do not overlap with sensors of the second model, statuses and controls from equipment of the first model that do not overlap with equipment of the second model and controls from actuators of the first model that do not overlap with actuators of the second model into a data processing tool, wherein the data processing tool generates the estimated cost to make the proposed NMC unit.

8. The method of claim 1, wherein the first and second models are manually generated.

9. The method of claim 1, wherein the proposed NMC unit and the previously developed NMC unit share a plurality of similarities.

10. A computer program product, comprising:

a non-transitory computer readable storage medium having computer readable program code embodied therewith, the computer readable program code comprising:

computer readable program code configured to perform the steps of:

receiving an input, wherein the input includes a first model of data flows between a proposed Network Monitoring and Control (NMC) unit and devices connected to the proposed NMC unit, wherein the first model is based on a Request for Proposal (RFP) and the data flows are defined by data types and primitives conforming to a modeling formalism; and comparing the first model with a second model, wherein the second model is a model of data flows between a previously developed NMC unit and devices connected to the previously developed NMC unit, wherein the second model is based on a prior RFP and the data flows are defined by data types and primitives conforming to the modeling formalism, wherein the comparison identifies differences between the data flows of the first and second models, wherein the devices include actuators, the data types of the modeling formalism include status and control, and the data flow between an actuator and the NMC unit include a control to be performed by that actuator, wherein the comparison comprises comparing the devices of the first model with the devices of the second model and identifying overlapping devices between the first and second models, wherein in response to identifying overlapping actuators, the controls of the overlapping actuators are compared to each other to find actuator controls of the first model that are different from actuator controls of the second model.

11. The computer program product of claim 10, wherein the computer readable program code is further configured to perform the step of estimating a cost to make the proposed NMC unit based on the comparison.

12. The computer program product of claim 11, wherein the devices include sensors and equipment.

13. The computer program product of claim 12, wherein the data flow between a sensor and the NMC unit includes a status of that sensor, and the data flow between an equipment and the NMC unit includes a status of that equipment and a control to be performed by that equipment.

14. The computer program product of claim 13, wherein in response to identifying overlapping sensors, the statuses of the overlapping sensors are compared to each other to find sensor statuses of the first model that are different from sensor statuses of the second model, wherein in response to identifying overlapping equipment, the statuses of the overlapping equipment are compared to each other to find equipment statuses of the first model that are different from equipment statuses of the second model and the controls of the overlapping equipment are compared to each other to find equipment controls of the first model that are different from equipment controls of the second model; and first compiling the different sensor statues, the different actuator controls, the different equipment statuses and the different equipment controls.

15. The computer program product of claim 14, wherein the comparison further comprises:

identifying devices between the first and second models that do not overlap; and second compiling statuses from sensors of the first model that do not overlap with sensors of the second model, statuses and controls from equipment of the first model that do not overlap with equipment of the second model and controls from actuators of the first model that do not overlap with actuators of the second model.

16. The computer program product of claim 15, wherein determining the estimated cost to make the proposed NMC unit comprises inputting the first compiled different sensor statues, different actuator controls, different equipment statuses and different equipment controls and second compiled statuses from sensors of the first model that do not overlap with sensors of the second model, statuses and controls from equipment of the first model that do not overlap with equipment of the second model and controls from actuators of the first model that do not overlap with actuators of the second model into a data processing tool, wherein the data processing tool generates the estimated cost to make the proposed NMC unit.

17. The computer program product of claim 10, wherein the first and second models are manually generated.

18. The computer program product of claim 10, wherein the proposed NMC unit and the previously developed NMC unit share a plurality of similarities.

19. A method, comprising:

receiving, at a processing device, an input, wherein the input includes a first model of data flows between a proposed Network Monitoring and Control (NMC) unit and devices connected to the proposed NMC unit, wherein the first model is based on a Request for Proposal (RFP) and the data flows are defined by data types and primitives conforming to a modeling formalism; and comparing, by using the processing device, the first model with a second model, wherein the second model is a model of data flows between a previously developed NMC unit and devices connected to the previously developed NMC unit, wherein the second model is based on a prior RFP and the data flows are defined by data types and primitives conforming to the modeling formalism, wherein the comparison identifies differences between the data flows of the first and second models, wherein the devices include equipment, the data types of the modeling formalism include status and control, the data flow between an equipment and the NMC unit includes a status of that equipment and a control to be performed by that equipment.

wherein the comparison comprises comparing the devices of the first model with the devices of the second model and identifying overlapping devices between the first and second models, wherein in response to identifying overlapping equipment, the statuses of the overlapping equipment are compared to each other to find equipment statuses of the first model that are different from equipment statuses of the second model and the controls of the overlapping equipment are compared to each other to find equipment controls of the first model that are different from equipment controls of the second model.

* * * * *